E. SAVY.

DEVICE FOR COATING PIECES OF CONFECTIONERY AND BISCUITS ON ONE SIDE ONLY.

APPLICATION FILED APR. 18, 1910.

1,189,002. Patented June 27, 1916.

4 SHEETS—SHEET 1.

WITNESSES:

H. A. Coombs

R. A. Press

INVENTOR

Emile Savy

BY Emil Bönnelycke

ATTORNEY.

THE COLUMBIA PLANOGRAPH CO., WASHINGTON, D. C.

E. SAVY.

DEVICE FOR COATING PIECES OF CONFECTIONERY AND BISCUITS ON ONE SIDE ONLY.

APPLICATION FILED APR. 18, 1910.

1,189,002.

Patented June 27, 1916.

4 SHEETS—SHEET 2.

WITNESSES:

H. A. Coombe

A. W. Mess

INVENTOR

Emile Savy

BY Emile Bönnelycke

ATTORNEY.

THE COLUMBIA PLANOGRAPH CO., WASHINGTON, D. C.

E. SAVY.

DEVICE FOR COATING PIECES OF CONFECTIONERY AND BISCUITS ON ONE SIDE ONLY.

APPLICATION FILED APR. 18, 1910.

1,189,002.

Patented June 27, 1916.

4 SHEETS—SHEET 3.

WITNESSES

H. A. Coombs

R. A. Ness

INVENTOR

Emile Savy

BY

Emile Bonnelycke

ATTORNEY.

THE COLUMBIA PLANOGRAPH CO., WASHINGTON, D. C.

E. SAVY.

DEVICE FOR COATING PIECES OF CONFECTIONERY AND BISCUITS ON ONE SIDE ONLY.

APPLICATION FILED APR. 18, 1910.

1,189,002.

Patented June 27, 1916.

4 SHEETS—SHEET 4.

WITNESSES:

J. L. Drummond

Catherine Gates

INVENTOR.

Emile Savy

BY Emil Bönnelycke

ATTORNEY.

THE COLUMBIA PLANOGRAPH CO., WASHINGTON, D. C.

UNITED STATES PATENT OFFICE.

EMILE SAVY, OF PARIS, FRANCE.

DEVICE FOR COATING PIECES OF CONFECTIONERY AND BISCUITS ON ONE SIDE ONLY.

1,189,002. Specification of Letters Patent. Patented June 27, 1916.

Application filed April 18, 1910. Serial No. 556,202.

*To all whom it may concern:*

Be it known that I, Emile Savy, a citizen of the Republic of France, and a resident of Paris, Seine, France, have invented new and useful Improvements in Devices for Coating Pieces of Confectionery and Biscuits on One Side Only, which improvements are fully set forth in the following specification.

Pieces of confectionery and biscuits simply covered on one of their faces with a layer of chocolate or burnt sugar syrup, have hitherto been manufactured by hand. The labor required for such work is, however, considerable.

The so-called icing machines enable a piece of confectionery or a biscuit to be iced completely in a practical manner, but its construction prevents the icing operation from being effected on one side only.

This invention relates to a machine by means of which it is possible to ice any kind of confectionery and biscuits on one side only.

This machine, while preserving the principal characteristic feature of the ordinary icing machine, both as regards the closed heated chamber and the devices used for mixing and raising the chocolate or the burnt sugar syrup, differs essentially by the arrangement of the conveyer band for the confectionery or biscuits, and also by the method of distributing chocolate, burnt sugar or any other similar icing, the distribution in question being effected by means of a hopper of special shape.

The machine is illustrated by way of example in the accompanying drawings in which—

Figure 1:
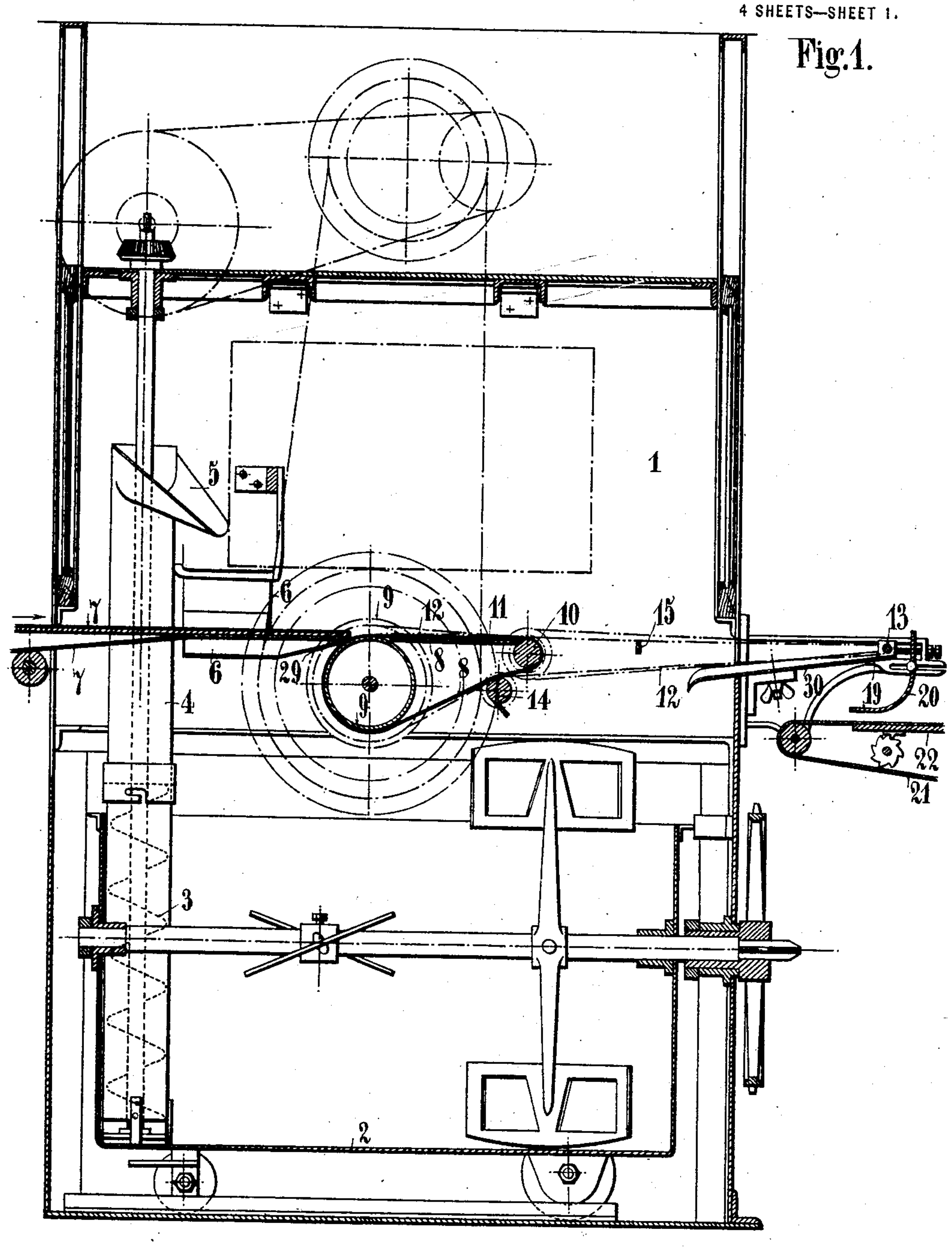
Figures 2, 3, 4:
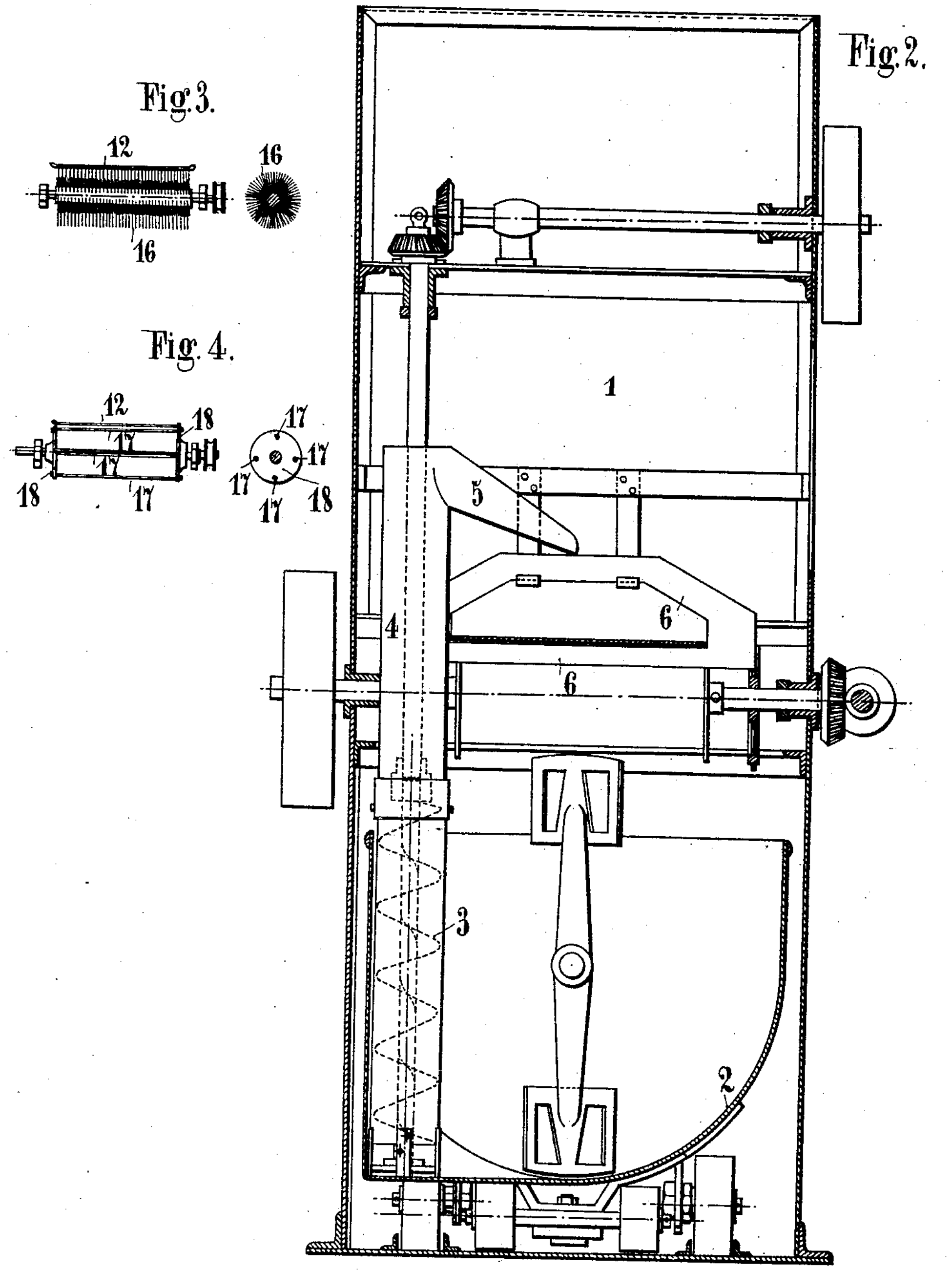
Figure 5:
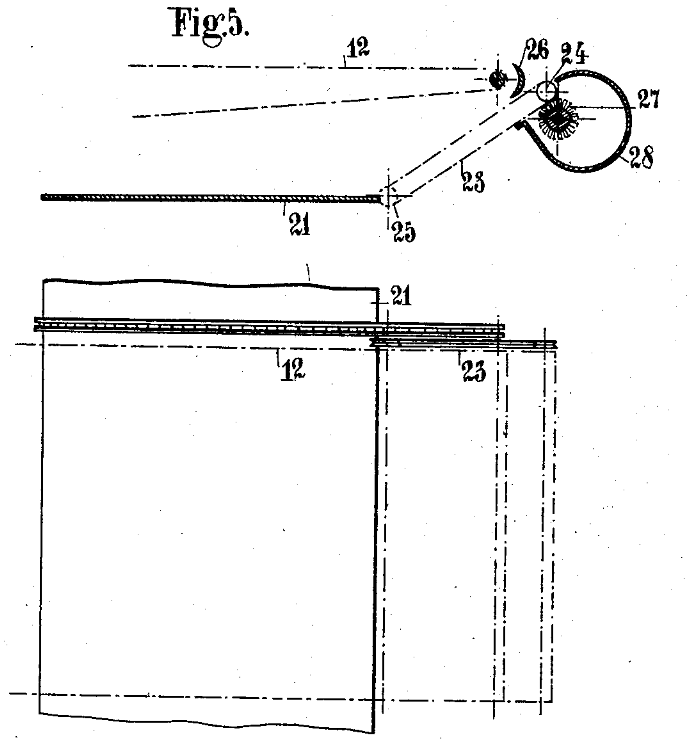
Figure 6:
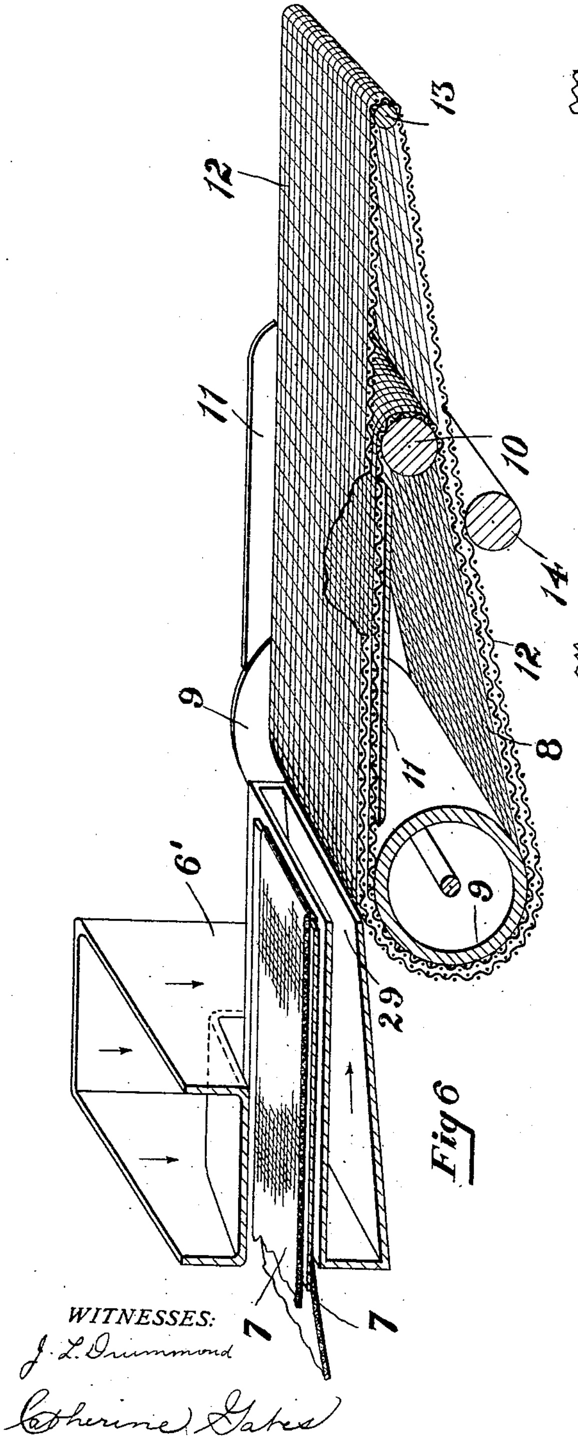
Figure 8:
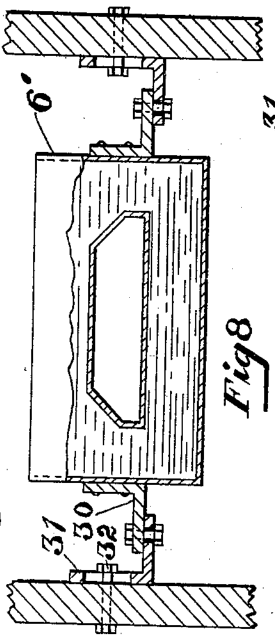
Figure 9:
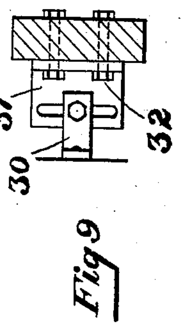
Figure 7:
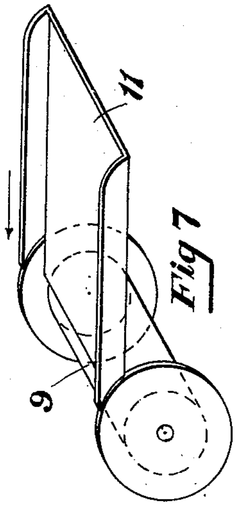

Figure 1 is a vertical longitudinal section, Fig. 2 a vertical cross-section, and Figs. 3–5 are detailed views. Fig. 6 is a sectional perspective view, on an enlarged scale, showing the hopper and traveling aprons; Fig. 7 is a perspective view, on an enlarged scale, of the driving roller and associated parts; Fig. 8 is a rear sectional elevation, on an enlarged scale, showing a slightly modified form of hopper and method of supporting the same; Fig. 9 is a detailed plan view of parts shown in Fig. 8.

Into a closed box 1 heated by steam, hot air, electricity, hot water or any other suitable means, is introduced a movable mixing vat 2 containing the material used for icing, such as chocolate, sugar syrup, etc. An Archimedes screw 3 rotating in a cylinder 4 provided at the top with a spout 5, raises the icing into a distributing hopper 6.

The articles to be iced are introduced into the case 1 by means of the conveyer band 7 on which they are placed, the side or face to be iced being in direct contact with the band. Behind the conveyer 7 is arranged another conveyer band 8 constituted by a flexible metal fabric with very close pivoted meshes or links, as impermeable as possible. This conveyer band is wound, on the one hand, on a driving drum 9 with cheeks or flanges and on the other hand, on another drum 10. The drive connections for the drum 9 are diagrammatically shown in Fig. 1 from which it is apparent that this drum is driven by a belt from a pulley located substantially directly above it. By the use of a series of stepped pulleys, the speed of drum 9 may be varied. A metal plate 11 with cheeks keeps the band of the said conveyer absolutely straight and prevents the paste or icing from escaping at the sides.

A second metal band 12, with links which are also pivoted but very wide, is wound on the same driving roll 9 as the band 8, with which it engages exactly at its upper portion. The band 12 is moreover in contact with the drum 10 which forms a support for it, and is wound on a stretching drum 13. The roller 14 forms a support for both the bands 8 and 12.

At 15 is arranged a movable scraper which if required, can be replaced by a small circular brush 16 (Fig. 3) or by wires 17 stretched between two plates 18. Whatever be the device used, its object is to remove the excess of the icing material that is liable to adhere to the bottom of the articles to be iced.

A scraper or knife 19 cleans the stretching cylinder 13.

An inclined plane 20 which is movable in every direction, delivers the iced articles on to a lower conveyer 21 which is identical to those of the ordinary icing machines, with the difference that the band of the said conveyer which is of waxed cloth or varnished paper, passes over a vibrating table 22. However, the inclined plane 20, which is sufficient for articles of large and medium dimensions, is not very practical for small biscuits, the shape of which is liable to make them roll, instead of sliding on the slope. The inclined plane, instead of being constituted by a simple blade, then comprises (Fig. 5) a small endless band 23 constituted by a canvas, waxed cloth, varnished leather or even a thin metal sheet stretched between two rollers 24 25, the spindles of which are secured to a frame with a variable inclination. The said rollers are driven by toothed wheels, chains, belts or any other means that can impart to them a variable speed. At 26 is arranged a small curved shutter which can be brought nearer or farther away at will, so as to prevent the confectionery or the biscuits from leaving the conveyer too soon. A circular brush 27 driven by an electric motor or by any other means, insures the cleaning of the conveyer 23. The material brushed off in the said cleaning is discharged into a reservoir 28.

It will be seen that in the construction shown in Fig. 5 the conveyer 21 for the finished pieces of confectionery is arranged at a right angle to the band 20, instead of being in line with it. Finally, a suitable gear by means of which the speed can be varied, completes the machine.

As clearly shown in Figs. 6 and 8 the hopper is provided with an opening extending centrally entirely through the same and through this opening works the conveyer 7. The hopper may be made either with the corners sloping, as shown in Figs. 1 and 2, or with a square top edge, as shown in Fig. 6.

Instead of the means shown in Figs. 1 and 2 for supporting the hopper it may be supported on each side by means of brackets 30 resting, in turn, upon brackets 31, secured to the frame of the machine by bolts 32. The connection between the brackets themselves and between the brackets 31 and the frame is by means of a slot so as to permit of the adjustment of the hopper.

The icing material placed in the bottom mixing vat 2, is raised by the screw 3 into the cylinder 4 and discharged through the spout 5 into the hopper 6 whence it escapes through the opening 29 extending throughout the whole width of the bands 8, 12, in a uniform layer, the thickness of which can be modified at will by altering the inclination of the hopper.

The icing material, spread in a layer of uniform thickness, is driven by the double conveyer band 8, 12 and remains on it owing to the impermeability of the metal band 8, but on arriving at the drum 10, and at the latest at the point where the scraper 15 is arranged, it falls again into the bottom mixing vat 2, the conveyer 12 with wide meshes being no longer able to support it.

After the above explanation, it will be readily understood how pieces of confectionery or biscuits are iced on one side only. The said pieces of confectionery having been placed on the conveyer with an endless band 7, with the face to be iced downward, are carried to the outlet opening 29 of the hopper 6 and are placed on the layer of semi liquid paste into which they penetrate owing to their weight, to the desired depth regulated by the thickness of the layer of the icing paste, and are carried by the two bands 8, 12 up to the roller 10. At that moment, the icing layer moves away, as has been stated before; the iced articles continue their travel, being carried by the band 12 with wide meshes; during the passage from the drum 10 to the drum 13, the excess of the icing material escapes automatically or is removed by the scraper 15 (or the brush) (Fig. 3) or wires (Fig. 4) and is discharged into the bottom vat 2 where it is mixed with the main portion. The carrying of the excess of paste is effected by the bottom portion of the conveyer 12 which travels above an inclined metal sheet 30 which receives the superfluous portions.

The confectionery iced at the bottom and deprived of the excess of icing in the manner described, continues its travel and turns about the roller 13. The pieces fall with their non-iced face on the inclined plane 20 which finally delivers them with the non-iced face downward to the conveyer band 21 which carries them in any direction, the said conveyer being arranged as desired either in line with the machine (Fig. 1) or at a right angle to the same (Fig. 5).

The iced cakes or sweets should have a shiny iced surface, which result is obtained by causing them to pass over a vibrating table 22 operated by ratchet wheels, cams or any other suitable means.

The pieces of confectionery thus covered on one face only, are carried through a refrigerating passage, or a current of hot air is sent over them if they are covered with syrup. They may be simply carried in the open air to the point where they are to be collected. The icing solidifies during the travel, and the articles can be packed at once.

For utilizing refrigerators of the usual kind, the iced cakes or the like could be received at the end of the inclined plane 20 on mental plates or bars simply arranged on the conveyer 21. The said plates or bars are then carried to the refrigerators or cold rooms.

Having now particularly described and ascertained the nature of my said invention and in what manner the same is to be performed, I declare that what I claim is a device for mechanically providing pieces of confectionery and biscuits with icing on one face only, chiefly characterized by:—

1. The combination in a cake coating machine, of a traveling apron adapted to receive a layer of coating material, a hopper arranged above the same and adapted to discharge coating material thereon, fixed cheek plates at the sides of said apron to prevent the escape of the coating material therefrom, means for feeding the cakes to be coated on to said apron at one end thereof, and means for automatically removing said cakes from the other end thereof.

2. In a cake coating machine, the combination with a hopper comprising a body portion and a delivery spout, said hopper having an opening extending entirely through the same, above said spout, of a conveyer belt passing through said opening, and adapted to carry the articles to be coated, and a traveling apron arranged so as to simultaneously receive such articles from said belt and material from the spout of the hopper.

3. In combination, a casing adapted to be kept at a constant temperature, a belt conveyer in said casing, means to apply a coating material to said conveyer, means to feed biscuits to said conveyer, the biscuit feeding means and the means for feeding the coating material arranged to discharge on and along the plane of, and in the same direction as, the travel of said conveyer.

4. In combination, a belt conveyer adapted to carry articles to be coated, a fountain feed hopper having a discharge outlet arranged to discharge coating material along the plane of, and onto the belt conveyer in a thin sheet, and means to deliver articles to be coated to said conveyer, said last named means being adapted to float the article on the coating material as the latter is being applied to the conveyer.

5. In combination, a casing, a hopper for coating material therein having a horizontal discharge opening, a conveyer starting from said opening and extending to the outside of said casing, and a biscuit conveyer extending into the casing to deliver biscuits to the first mentioned conveyer at the point where the hopper discharges, all for the purposes described.

6. A confectionery machine, comprising a traveling apron, a chocolate supply, a fountain feed, and means for floating the articles to be coated upon the chocolate as it pours from the feed to the apron.

7. In a coating machine, a coating belt, a feeding belt adapted to deliver to said coating belt, a hopper, means to supply coating material to said hopper above said feeding belt, said hopper being arranged to deliver the material to the coating belt below said feeding belt.

8. In a chocolate coating machine, a coating belt, means to simultaneously deliver biscuits and coating material along the line of and in the plane of said belt, delivery means to separate the coated biscuits from the excess coating material on the coating belt.

9. A coating machine, including in combination, a conveyer arranged to carry an unbroken sheet of the coating material in a plastic condition between it and the artciles to be coated, and means arranged adjacent the conveyer to feed the sheet of coating material thereto and provided with a sheet forming nozzle, extending transversely of and directed toward the line of travel of the conveyer to feed the sheet of coating material of a desired thickness thereon in a uniform and unbroken manner, whereby the articles to be coated may be fed to and sink evenly into said material in a predetermined manner as the sheet is carried by the conveyer and a second conveyer arranged to receive and carry the coated articles and permit the excess coating material to fall therethrough.

10. A coating machine comprising a conveyer constructed to carry a continuous sheet of coating material thereon and on which the coating operation takes place, feeding means arranged to force a continuous sheet of coating material of predetermined thickness onto the conveyer whereby articles to be coated may be carried thereon, said feeding means having a sheet forming nozzle independent of and adjacent the conveyer, and means to separate the coated articles from the unused sheet.

11. A coating machine comprising a conveyer constructed to carry a continuous sheet of coating material thereon and on which the coating operation takes place, means to feed articles to be coated on the top of the sheet of coating material, feeding means arranged to force a continuous sheet of coating material of predetermined thickness onto the conveyer whereby articles to be coated may be carried thereon, said feeding means having a sheet forming nozzle independent of and adjacent the conveyer, and means to separate the coated articles from the unused sheet.

Dated this 8th day of April, 1910.

In testimony whereof I have signed this specification in the presence of two subscribing witnesses.

EMILE SAVY.

Witnesses:
EMILE LEDRET,
H. C. COXE.

Copies of this patent may be obtained for five cents each, by addressing the "Commissioner of Patents, Washington, D. C."